United States Patent
Savant

(10) Patent No.: US 8,700,686 B1
(45) Date of Patent: Apr. 15, 2014

(54) ROBUST ESTIMATION OF TIME VARYING PARAMETERS

(75) Inventor: Shrikant V. Savant, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 1540 days.

(21) Appl. No.: 11/984,094

(22) Filed: Nov. 13, 2007

(51) Int. Cl.
*G06F 7/00* (2006.01)
*G06F 7/38* (2006.01)

(52) U.S. Cl.
USPC .......................................... 708/200; 708/446

(58) Field of Classification Search
USPC .................. 708/446, 200; 703/6, 9
See application file for complete search history.

(56) References Cited

U.S. PATENT DOCUMENTS

| | | | | |
|---|---|---|---|---|
| 4,725,942 | A * | 2/1988 | Osuka | 700/30 |
| 7,080,290 | B2 * | 7/2006 | James et al. | 714/47.2 |
| 7,349,778 | B2 * | 3/2008 | Shin et al. | 701/41 |
| 2004/0039555 | A1 * | 2/2004 | Ulyanov et al. | 703/2 |
| 2009/0033259 | A1 * | 2/2009 | Cesario et al. | 318/400.04 |

* cited by examiner

*Primary Examiner* — Chuong D Ngo
(74) *Attorney, Agent, or Firm* — Venable LLP; Michael A. Sartori; Todd R. Farnsworth

(57) ABSTRACT

A computer-implemented method for estimating a time-varying parameter of a nonlinear system includes receiving input data for the nonlinear system, the input data including a desired state and a desired state derivative of the nonlinear system for a number of time points, generating for one of the plurality of time points an approximate time-varying parameter based on at least the desired state, the desired state derivative, an approximate state of the nonlinear system, and a Lyapunov function, and providing the approximate time-varying parameter for the one of the plurality of time points.

23 Claims, 9 Drawing Sheets

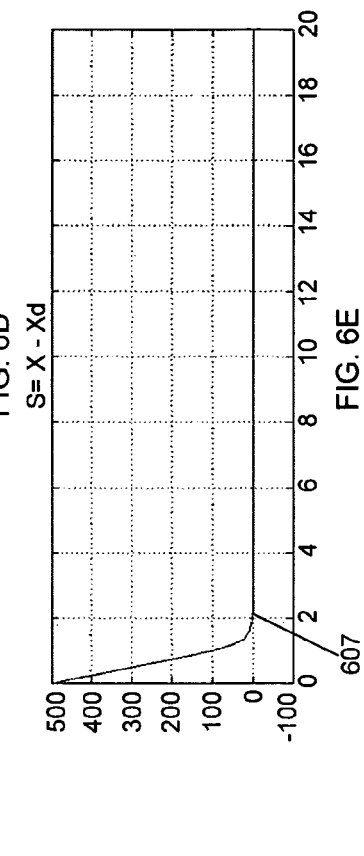
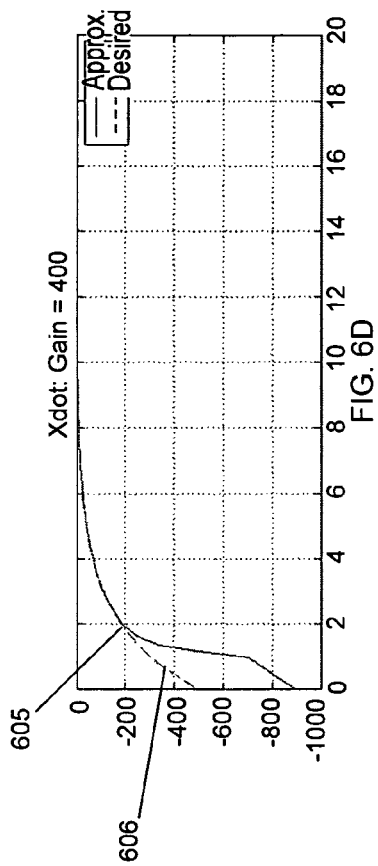
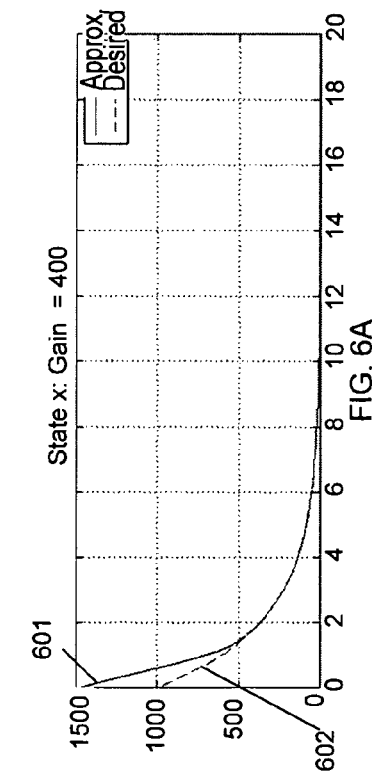

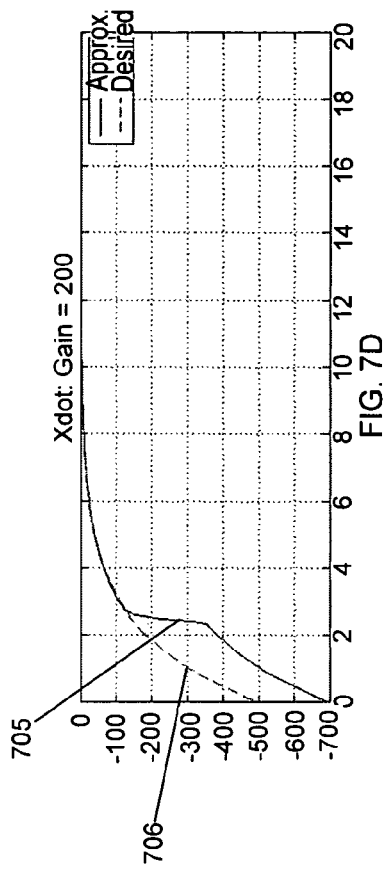
FIG. 7A
FIG. 7B
FIG. 7C
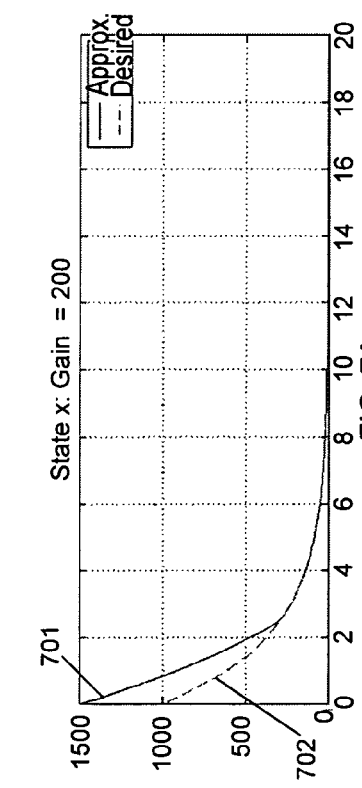
FIG. 7D
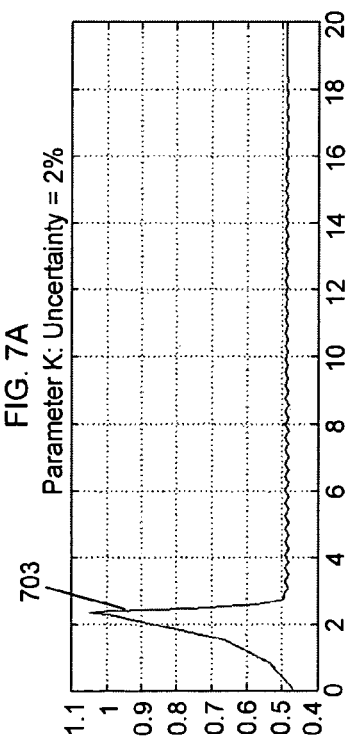
FIG. 7E

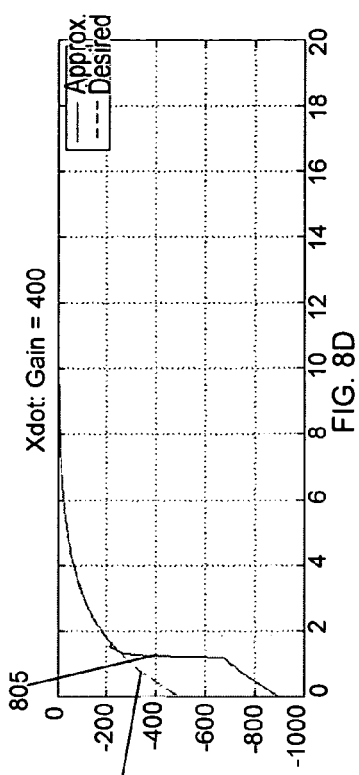
FIG. 8A
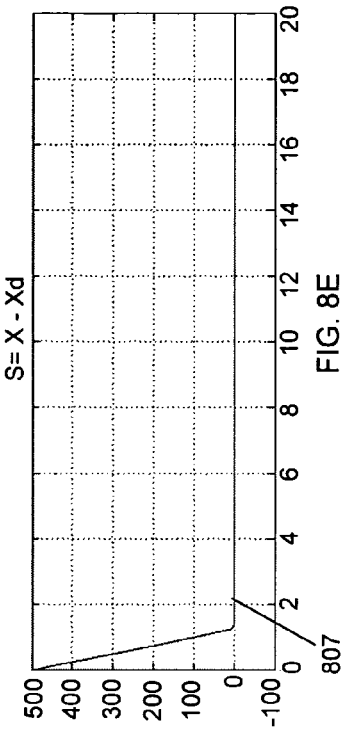
FIG. 8B
FIG. 8C
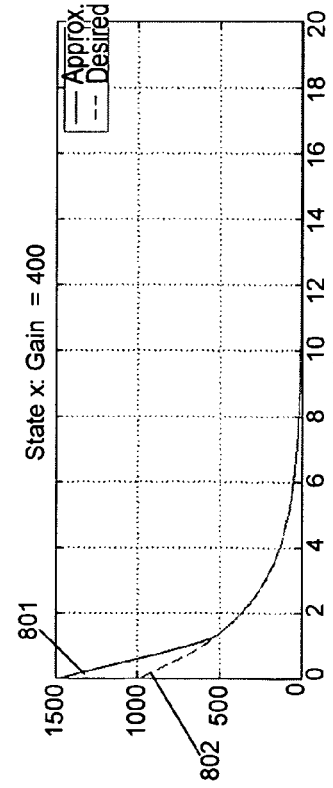
FIG. 8D
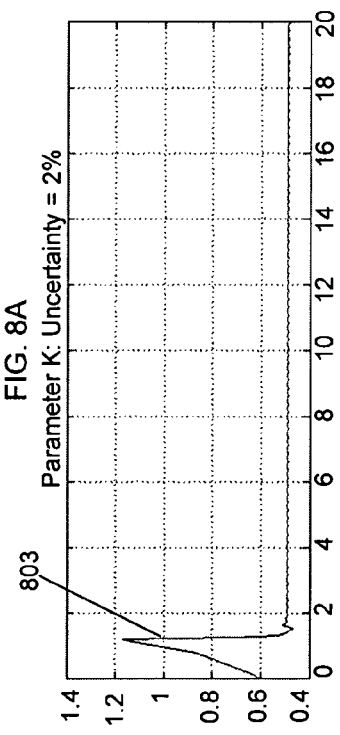
FIG. 8E

ROBUST ESTIMATION OF TIME VARYING PARAMETERS

BACKGROUND

A nonlinear system may be simulated by implementing a dynamic equation in a computer. The dynamic equation may be driven by one or more parameters. Properly chosen parameters may allow for the results of running the simulation to match experimental data obtained from measuring the dynamic behavior of the nonlinear system. A conventional technique for estimating parameters of a nonlinear system model uses an optimization algorithm for the purpose of minimizing an objective function which measures the difference between the desired state, generally based on experimental data, and a predicted state of the nonlinear system model. This approach requires a full simulation to be performed for every optimization iteration. Conventional techniques may only work for parameters which are constant, and may be incapable of properly estimating parameters if the parameters are dynamic. Further, conventional techniques may not deal with uncertainty in the nonlinear system model.

SUMMARY

One embodiment includes a computer-implemented method for estimating a time-varying parameter of a nonlinear system, including receiving input data for the nonlinear system, the input data including a desired state and a desired state derivative of the nonlinear system for a number of time points, generating for one of the plurality of time points an approximate time-varying parameter based on at least the desired state, the desired state derivative, an approximate state of the nonlinear system, a Lyapunov function, and providing the approximate time-varying parameter for the one of the plurality of time points.

One embodiment includes a computer-readable medium including instructions, which when executed by a computer system causes the computer system to perform operations for estimating a time-varying parameter of a nonlinear system, the computer-readable medium including instructions for receiving input data for the nonlinear system, the input data including a desired state and a desired state derivative of the nonlinear system for a number of time points, instructions for generating for one of the plurality of time points an approximate time-varying parameter based on at least the desired state, the desired state derivative, an approximate state of the nonlinear system, and a Lyapunov function, and instructions for providing the approximate time-varying parameter for the one of the plurality of time points.

One embodiment includes a system for estimating a time-varying parameter of a nonlinear system including means for receiving input data for the nonlinear system, the input data including a desired state and a desired state derivative of the nonlinear system for a number of time points, means for generating for one of the plurality of time points an approximate time-varying parameter based on at least the desired state, the desired state derivative, an approximate state of the nonlinear system, and a Lyapunov function, and means for providing the approximate time-varying parameter for the one of the plurality of time points.

Further features of the invention, as well as the structure and operation of various embodiments of the invention, are described in detail below with reference to the accompanying drawings.

BRIEF DESCRIPTION OF THE DRAWINGS

The foregoing and other features will be apparent from the following, more particular description of exemplary embodiments, as illustrated in the accompanying drawings wherein like reference numbers generally indicate identical, functionally similar, and/or structurally similar elements. The left most digits in the corresponding reference number indicate the drawing in which an element first appears.

FIGS. 6A-6E depict results from estimating a time-varying parameter of an exemplary nonlinear system.

FIGS. 7A-7E depict results from estimating a time-varying parameter of an exemplary nonlinear system.

FIGS. 8A-8E depict results from estimating a time-varying parameter of an exemplary nonlinear system.

DEFINITIONS

Figure 1:
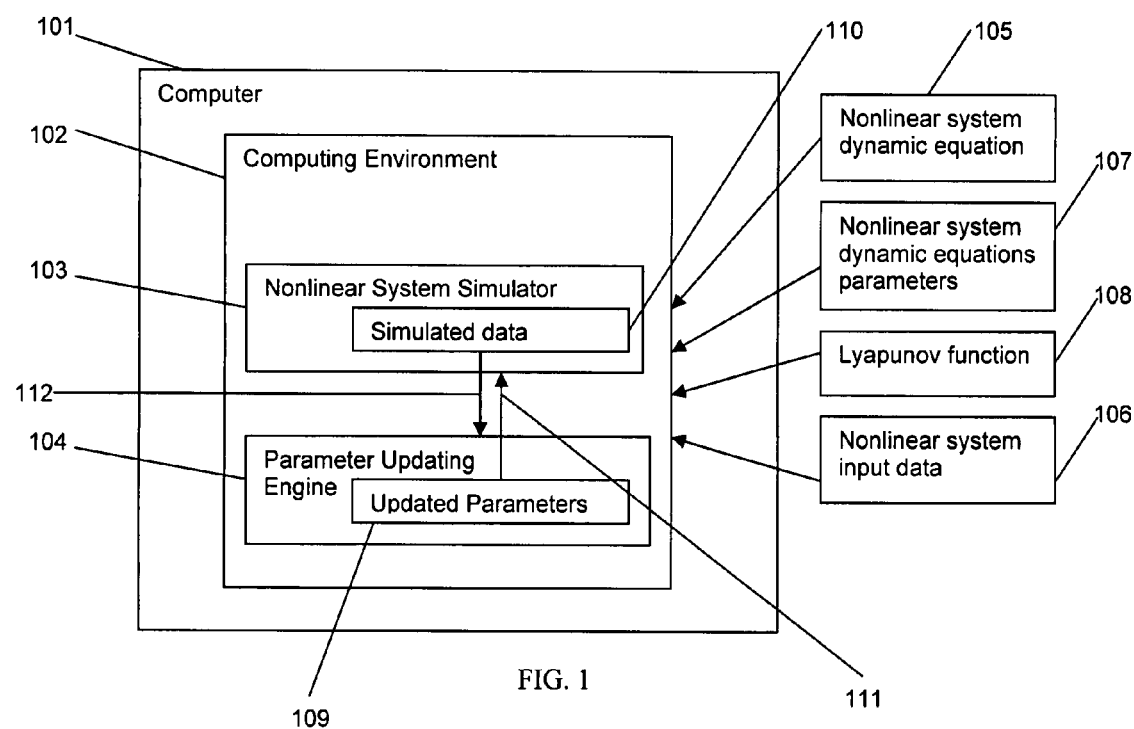
FIG. 1 depicts an exemplary system for estimating a time-varying parameter of a nonlinear system.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); an optical computer; and an apparatus that may accept data, may process data in accordance with one or more stored software programs, may generate results, and typically may include input, output, storage, arithmetic, logic, and/or control units.

"Software" may refer to prescribed rules to operate a computer or a portion of a computer. Examples of software may include: code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and/or control units.

A "network" may refer to a number of computers and associated devices that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, quantum network protocols, etc.

DETAILED DESCRIPTION OF EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

Many phenomena may be considered to be nonlinear systems. Nonlinear systems may include, for example, predator-prey models, radioactive decay models, fluid dynamics, population dynamics, and gene regulatory networks. A nonlinear system may be modeled using a dynamic equation reliant on one or more parameters and then simulated on a computer. The parameters may represent features of the nonlinear system. For example, if the nonlinear system is a predator-prey system, a parameter for the dynamic equation modeling the system may represent the mortality rate of the predator and another parameter may represent the reproductive rate of the prey. The parameters of a dynamic equation used to model a nonlinear system may be determined by comparing the states of the nonlinear system as predicted by the dynamic equation with the states of the nonlinear system as determined by input data, which may be experimentally determined. The parameters of the nonlinear system may be adjusted to achieve predicted states that match the states in the input data. In the predator-prey system, for example, the mortality rate of the predator in the system may be adjusted until the predator-prey system produces values for the populations of the predator and the prey that match experimentally observed values. Further, the parameters of a dynamic equation may be time dependent, that is, vary with time. In the predator-prey system, for example, the parameter for the mortality rate of the predator may not be constant, but instead may fluctuate over time based on any number of factors, such as, for example, changes in the overall immunity to disease of the predator population. In the case of a parameter that varies with time, the parameter may need to be adjusted as a simulation progresses to allow the dynamic equation to produce values that match input data such as experimentally observed values.

FIG. 1 depicts an exemplary system for estimating a time-varying parameter of a nonlinear system. Computer 101 may run computing environment 102. As an example, the computing environment 102 may employ an array-based programming language. The array-based programming language may include commands operating on vector data types. Examples of the array-based programming language may include the language of MATLAB® computing environment by The MathWorks, Inc. of Natick, Mass. or any other language that includes at least some commands that are executable in the MATLAB® computing environment. Alternative embodiments may employ other programming languages, whether industry standard or custom-designed. The techniques described herein may be embodied in functional components, such as, for example, in a function, a model, a class, or other program element. As another example, the computing environment may employ the ability to generate graphical models that may be simulated. Such a computing environment may be, for example, Simulink® by The MathWorks, Inc., Stateflow® by The MathWorks, Inc., SimBiology™ by The MathWorks, Inc., LabView® by National Instruments, Inc., or VisSim by Visual Solutions, Inc. The techniques described herein may be embodied in functional components of such a computing environment, such as, for example, in a simulation block, or a simulation toolset. The techniques described herein may also generally be embodied in any textual and/or graphical programming environment.

The computing environment 102 may contain nonlinear system simulator 103. The nonlinear system simulator 103 may be a part of the computing environment 102 programmed to receive as input representations of nonlinear system dynamic equation 105 and nonlinear system dynamic equation parameters 107 and produce simulated data 110 by evaluating the nonlinear system dynamic equation 105 using the nonlinear dynamic equation parameters 107. The simulated data 110 may represent predicted states of the nonlinear system modeled by the nonlinear system dynamic equation 105. The nonlinear system dynamic equation 105 may be any dynamic equation for a nonlinear system, and the nonlinear system dynamic equation parameters 107 may be the parameters required for the evaluation of the nonlinear system dynamic equation 105. Representations of both the nonlinear system dynamic equation 105 and the nonlinear system dynamic equation parameters 107 may be provided to the computing environment 102, where they may be accessible to the nonlinear system simulator 103.

A representation of Lyapunov function 108 may also be provided to the computing environment 102. The Lyapunov function 108 may be a function which can be used to prove the stability or instability of fixed points in dynamical systems. The Lyapunov function 108 may be a Lyapunov function identified based on the properties of the nonlinear system dynamic equation 105.

A representation of nonlinear system input data 106 may also be provided to the computing environment 102. The nonlinear system input data 106 may correspond to the values observed experimentally, or experimental data, for a system of the type modeled by nonlinear system dynamic equation 105. For example, if the nonlinear system dynamic equation 105 models population dynamics for a population of fruit flies, nonlinear system input data 106 may be experimental data including experimentally observed values for the population level of a population of fruit flies over time. The nonlinear system input data 106 may also be data based on multiple instances of experimental observation, for example, averaged values from multiple fruit fly population experiments, data based on predictions made in any way, such as, for example, statistical data determined through the use of statistical models, measured data of any suitable type, or data created by, for example, a user. Data in nonlinear system input data 106 may be organized according to time points. For example, values for experimental data may be observed every 5 seconds, so the first value in nonlinear system input data 106 may be the value observed at a first time point at a time of 0 seconds, and the second value in nonlinear system input data 106 may be a value observed at a second time point at a time of 5 seconds, and so on. Time points used to organize nonlinear system input data 106 may be periodic or aperiodic. Values in the nonlinear system input data 106 may represent desired states. "Desired states" may refer to the objective of aligning the nonlinear system dynamic equation 105 and the nonlinear system dynamic equation parameters 107 with the nonlinear system input data 106: ideally obtaining a close match between states produced by evaluating the nonlinear system dynamic equation 105 using the nonlinear system dynamic equation parameters 107 and the nonlinear system input data 106. The representation of nonlinear system input data 106 may be provided to the computing environment 102 all at once, or it may be provided only as needed, and may be provided by, for example, a user, another computer, or experimental hardware accessible by the computer 101. For example, the computer 101 may access experimental hardware to obtain the representation of a single value from the nonlinear system input data 106 only at the time when the single value is needed.

The computing environment 102 may also contain parameter updating engine 104. The parameter updating engine 104 may be a part of the computing environment 102 programmed to perform the estimation of one or more time-varying parameters using the nonlinear system simulator 103. The parameter updating engine 104 may access the representations of the nonlinear system dynamic equations 105, the nonlinear system dynamic equation parameters 107, the Lyapunov function 108, and the nonlinear system input data 106 provided to the computing environment 102. The parameter updating engine 104 may use the nonlinear system simulator 103 to simulate the nonlinear system with the representations of the nonlinear system dynamic equation 105 and the nonlinear system dynamic equation parameters 107. The resulting simulated data 110 may be values representing the predicted state of the nonlinear system at one time point. The simulated data 110 may be received by the parameter updating engine 104 from the nonlinear system simulator 103 through data flow 112. The representation of the Lyapunov function 108, in combination with the representation of the nonlinear system dynamic equation 105, may be applied by the parameter updating engine 104 to the simulated data 110 and the corresponding values for the time point from the nonlinear system input data 106, to adjust the values of the nonlinear system parameters 107, producing updated parameters 109. The updated parameters 109 may be sent to the nonlinear system simulator 103 though data flow 111. The process may then be repeated for another time point wherein the nonlinear system simulator 103 uses the updated parameters 109 to evaluate the nonlinear system dynamic equation 105.

For example, with a nonlinear population dynamics model whose output is a value representing the population at a time point, the representation of the nonlinear system dynamic equation 105 representing the population dynamics model may be received by the computing environment 102, along with the representation of the nonlinear system dynamic equation parameters 107 for the population dynamics model, the representation of the Lyapunov function 108 selected for its relation to the population dynamics model, and the representation of the nonlinear system input data 106 gathered from observation of a real world population dynamics system, for example, the population levels of a population fruit flies. The nonlinear system dynamic equation 105 for a population dynamics model may be, for example:

$$\dot{X}(t)=X(t)(1-X(t))K(t)$$

where $X(t)$ may represent the current population level, $\dot{X}(t)$ may represent the change in population level, and $K(t)$ may be a parameter representing a factor that may cause changes in the population level, for example, the combined reproduction and mortality rate of the population. $K(t)$ may be a time-varying parameter.

The nonlinear system simulator 103 may be used by the parameter updating engine 104 to simulate the population dynamics model for one time point, using the representation of the nonlinear system dynamic equation 105 for a population dynamics model and an initial value for $X(0)$ which may be random or may be obtained from nonlinear system input data 106, and may be used to calculate an initial value for the nonlinear system parameters 107 $K(t)$. The resulting simulated data 110 may be the single value representing a predicted value for the population at that time point. The single value may be received by the parameter updating engine 104 through the data flow 112, and compared with the value for the population level at the corresponding time point from the nonlinear system input data 106, which may represent the desired state for the population dynamics model at the time point. The representation of the Lyapunov function 108, in combination with the representation of the nonlinear system dynamic equation 105 for the population dynamics model, may be used to adjust the value of the nonlinear system dynamic equation parameters 107 $K(t)$ of the population dynamics model. The adjustment may be based on the difference between the predicted value for the population level as determined by the nonlinear system simulator 103 and the value for the population level from the nonlinear system input data 106 at the same time point. The new value for the nonlinear system dynamic equation parameters 107 $K(t)$, the updated parameters 109, may then be sent back to the nonlinear system simulator 103 through the data flow 111. The process may be repeated with the updated parameters 109 and the previously calculated value for the population level, until all of the data from a sampling of nonlinear system input data 106 that remains has been used. The sampling of nonlinear system input data 106 used may include data for any number of time points, and may be preselected, or may be determined before or after the evaluation of each time point. At the end of the process, the values for the updated parameter $K(t)$ 109 may be such that when the population dynamics model is simulated with the values for the updated parameter $K(t)$ 109 by the nonlinear system simulator 103, the predicted values for the population level may ideally match closely with the values for the population level from the nonlinear system input data 106.

Figure 2A:
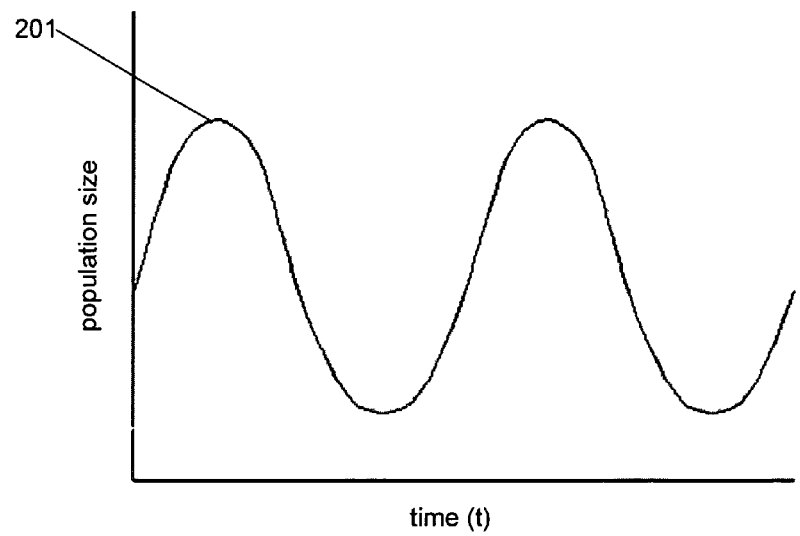
FIGS. 2A and 2B depict exemplary graphs for a nonlinear population dynamics model.
Figure 2B:
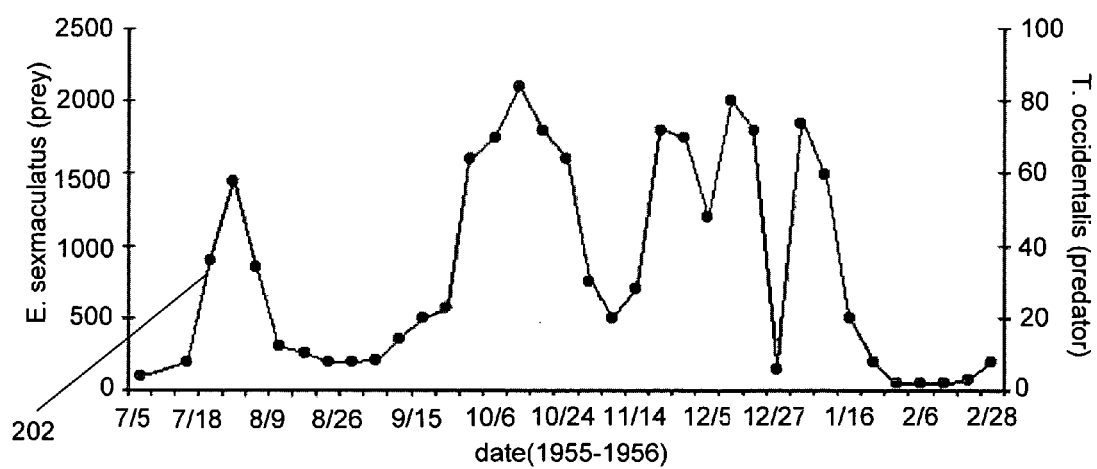

FIG. 2 depicts exemplary graphs for a nonlinear population dynamics model. FIG. 2A depicts an exemplary graph of a nonlinear population dynamics model based on the dynamic equation and parameter described above. Solid line 201 represents the population level X(t) predicted by the nonlinear system dynamic equation for population dynamics as measured against time. The data for the solid line 201 may be determined with the parameter K(t) used in the evaluation of the dynamic equation for the population dynamics model, and may be produced by the nonlinear system simulator 103. FIG. 2B depicts an exemplary graph of the nonlinear system input data 106 corresponding to the population dynamics model. Solid line 202 represents the experimentally observed levels of the population being modeled as measured against time. The data for solid line 202 may be determined experimentally.

The process of estimating a time-varying parameter of a nonlinear system for the population dynamics model depicted in FIG. 2 may start with the evaluation of the solid line 201 at a first time point by the nonlinear system simulator 103. The evaluation may be based on the received representations of the nonlinear system dynamic equation 105 for the population dynamics model and the nonlinear system dynamic equation parameters 107 for the population dynamics model. The results of the evaluation of the solid line 201 by the nonlinear system simulator 103 at the first time point may be the simulated data 110, which may then be compared to the solid line 202, which may be the nonlinear system input data 106, at the first time point by parameter updating engine 104. The parameter updating engine 104 may determine whether the nonlinear system dynamic equation 105 for the population dynamics model produces results that match the experimentally observed values from the nonlinear system input data 106. If the solid line 201 diverges from solid line 202 at the time point, the simulated data 110 does not match the nonlinear system input data 106 for the time point, and the parameter K(t) used in the evaluation of the nonlinear system dynamic equation 105 for the population dynamics model may be adjusted. The parameter K(t) may be adjusted by the parameter updating engine 104 using the representation of the nonlinear system dynamic equation 105 and a received representation of a selected Lyapunov function 108, resulting in updated parameter 109 K(t). The process may then be repeated for a second time point, which may be the next time point in a selected sampling of the nonlinear system input data 106 and may be any time point after the first point, with updated parameter 109 K(t) being used by the nonlinear system simulator 103 to evaluate solid line 201. All subsequent time points for which population values are available in the selected sampling of the nonlinear system input data 106, as depicted on the graph in FIG. 2B, may be evaluated in this manner. At the end of the process, the parameter K(t) may have been adjusted such that, when the adjusted parameter K(t) is used in evaluating the population dynamics model with the nonlinear system simulator 103, starting again at the first time point, the nonlinear system simulator 103 may produce the simulated data 110 which, when graphed, may form a line which closely corresponds to the solid line 202.

Figure 3:
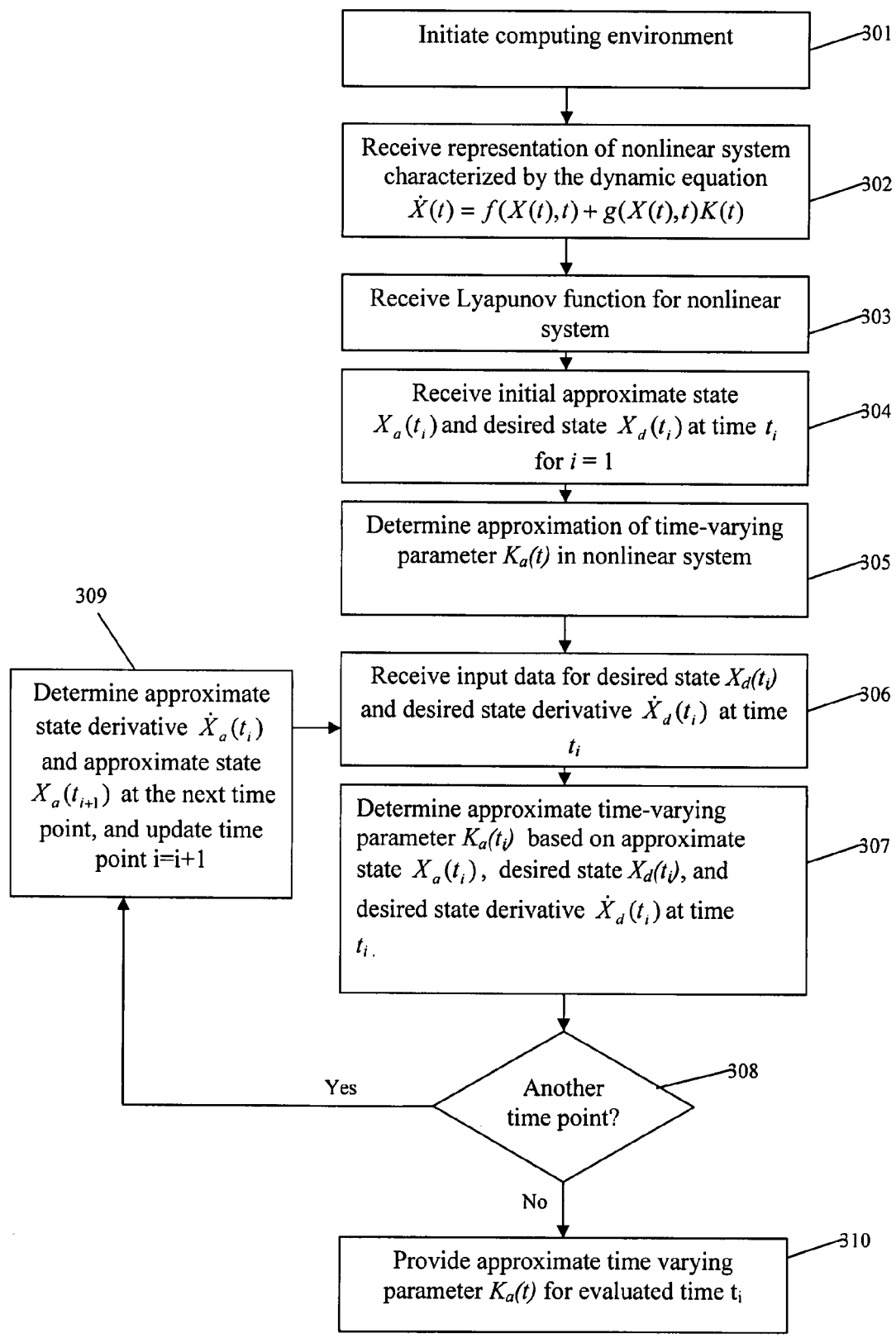
FIG. 3 depicts an exemplary flowchart for a process for estimating a time-varying parameter of a nonlinear system.

FIG. 3 depicts an exemplary flowchart for a process for estimating time-varying parameters of a nonlinear system. Elements of FIG. 1 may initially be referenced by reference numeral with regards to FIG. 3. However the reference numerals for FIG. 1 elements may be omitted in the discussion below to avoid confusion with the mathematical concepts described below.

In block 301, a computing environment may be initiated. An exemplary embodiment may be implemented within a computing environment running on a computer, or any other suitable computing device. The exemplary embodiment may be implemented with the computing environment 102 running on the computer 101.

In block 302, the nonlinear system dynamic equation 105 may be identified, and a representation thereof may be received by the computing environment 102. The nonlinear system may be, for example, a nonlinear biological system described by a biochemical network of reactions, such as, for example, the Glycolysis Pathway, a gene-regulatory network, a predator-prey system, a radioactive decay model, a fluid dynamics model, a population dynamics model, or any other type of nonlinear system. The nonlinear system may be characterized by the nonlinear system dynamic equation 105:

$$\dot{X}(t)=f(X(t),t)+g(X(t),t)K(t) \qquad (1)$$

wherein $X(t) \in R^n$ is an n-dimensional state vector, t is a scalar time variable, $K(t) \in R^m$ is an m-dimensional parameter vector dependent on t, $f \in R^n$ is an n-dimensional nonlinear function dependent upon X(t) and t, $g \in R^{n \times m}$ is a nonlinear function dependent upon X(t) and t, and $\dot{X}(t) \in R^n$ is an n-dimensional vector representing the dynamics of the nonlinear system in the form of a derivative of the state vector X(t) with respect to time t. For example, in the population dynamics model, X(t) may represent the population level, and K(t) may represent a combination of the reproduction and mortality rates of the population.

In block 303, the Lyapunov function 108 may be identified, and a representation of the Lyapunov function 108 may be received by the computing environment 102. The Lyapunov function 108 may be a function which can be used to prove the stability or instability of fixed points in dynamical systems, and may be a scalar function V(t, X) that is continuously differentiable and locally positive definite in a region D. The Lyapunov function V(t, X) may be characterized by V(t,0)=0 for all t≥0 and V(t, X)≥0 for all t≥0 and X≠0, where X(t) is any state vector that lies in region D. As an example, the Lyapunov function V(t, X) may be:

$$V(t, X) = \frac{1}{2}s(t)^T s(t) \qquad (2)$$

where V(t, X) is scalar and dependent on time t and state X(t), $s(t)=s(X(t)) \in R^n$ is an n-dimensional vector, and $s(t)^T \in R^{1 \times n}$ is the transpose of s(t). Further, $$s(t)=X_a(t)-X_d(t) \qquad (3)$$

where $X_a(t) \in R^n$ is an n-dimensional approximate state vector, and $X_d(t) \in R^n$ is an n-dimensional desired state vector, and, $$\dot{s}(t)=\dot{X}_a(t)-\dot{X}_d(t) \qquad (4)$$

where $\dot{s}(t) \in R^n$ is an n-dimensional vector representing the derivative of s(t) with respect to time t, $\dot{X}_a(t) \in R^n$ is an n-dimensional vector representing the derivative of $X_a(t)$, and $\dot{X}_d(t) \in R^n$ is an n-dimensional vector representing the derivative of $X_d(t)$. Thus, $$\dot{V}(t,X)=s(t)^T \dot{s}(t) \qquad (5).$$

where $\dot{V}(t, X(t))$ is a scalar representing the derivative of V(t,X(t)).

For example, in the population dynamics model, the approximate state vector $X_a(t)$ may represent a predicted population level at time t as determined by the nonlinear system dynamic equation 105 used in the population dynamics model. The desired state $X_d(t)$ may represent an observed value for the population level time t, as determined experimentally, which is the desired value for the nonlinear system dynamic equation 105 for the population dynamics model to produce. The difference s(t) may therefore represent the difference between the population level of as predicted by the nonlinear system dynamic equation 105 used in the population dynamics model and the experimentally determined population level, which may be obtained from nonlinear system input data 106. The derivative of the difference, $\dot{s}(t)$, may represent the difference between the rates at which the predicted value for the population level and experimental value for the population level are changing. These values may be used with the Lyapunov function 108 by the parameter updating engine 104 to minimize the differences between predicted and experimental values for population level by adjusting the parameter K(t).

In block 304, an initial approximate state $X_a(t_i)$ and initial desired state $X_d(t_i)$ of the nonlinear system may be received by the computing environment 102 for time $t_i$ where i=1. The initial approximate state $X_a(t_i)$ for i=1 and initial desired state $X_d(t_i)$ may be received by accessing data stored on the computer 101 running in the computing environment 102, accessing data stored on another computer coupled via a network to the computer running the computing environment 102, or accessing the nonlinear system input data 106 from equipment (e.g. hardware and/or software) coupled to the computer running the computing environment 102. For example, in the population dynamics model the initial desired state $X_d(t_i)$ for i=1 may be obtained from the value of the nonlinear system input data 106 for i=1. The initial approximate state $X_a(t_i)$ may also be obtained from, or based on, the value of the nonlinear system input data 106 for i=1. For example, initial approximate state $X_a(t_i)$ may be set to a value higher than the value of the nonlinear system input data 106 for i=1. For example, the experiment used to collect the nonlinear system input data 106 may have started with an initial population level of 500, which may be used as an initial value for desired state $X_d(t_i)$ and approximate state $X_a(t_i)$.

In block 305, an approximation of the time-varying parameter K(t) for the nonlinear system dynamic equation 105 may be determined by the parameter updating engine 104. The approximation of the time-varying parameter $K_a(t)$ may be determined as follows, based on equations (1)-(5) above:

$$K_a(t) = g(X_a(t))^{-1}[-f(X_a(t),t) + \dot{X}_d(t) - \eta \operatorname{sgn}(s(t))] \quad (6)$$

where η is a scalar gain factor and η>0, and sgn(s(t))∈R" is the signum function. For example, $K_a(t_i)$ for i=1 for the population dynamics model may be determined by the parameter updating engine 104 using the experimentally determined value of desired state $X_d(t_i)$ for the population level at i=1 and a predicted value of approximate state $X_a(t_i)$ for the population level at i=1 received in block 304.

In block 306, the representations of the nonlinear system input data 106 for the desired state $X_d(t)$ and the desired state derivative $\dot{X}_d(t)$ for the nonlinear system identified in block 302 may be received by the parameter updating engine 104. The representation of the nonlinear system input data 106 may be received by accessing the nonlinear system input data 106 stored on the computer 101 running the computing environment 102, accessing the nonlinear system input data 106 stored on another computer coupled via a network to the computer 101, accessing the nonlinear system input data 106 from equipment (e.g., hardware and/or software) coupled to the computer 101, or entered into the computer 101 by a user. For example, in the population dynamics model, experimentally determined values for the population level may be received for the value of $X_d(t_i)$ at each time point. The desired state derivative $\dot{X}_d(t)$ may be included in the nonlinear system input data 106, or it may be computed based on the nonlinear system input data 106 before the parameter updating engine 104 receives the nonlinear system input data 106 or may be computed by a component of the parameter updating engine 104 upon receipt of the nonlinear system input data 106 by any suitable method for the computation of a derivative. The desired state derivative $\dot{X}_d(t)$ may be an approximation or estimate based on nonlinear system input data 106.

In block 307, the approximate time-varying parameter $K_a(t_i)$ may be determined based on the approximate state $X_a(t_i)$, the desired state $X_d(t_i)$, and desired state derivative $\dot{X}_d(t_i)$ at time $t_i$ by the parameter updating engine 104, resulting in the updated parameters 109. Approximate state $X_a(t_i)$ may be received by the parameter updating engine 104 as the simulated data 110 sent from the nonlinear system simulator 103 through the data flow 112. Desired state $X_d(t_i)$ and desired state derivative $\dot{X}_d(t)$ may have been received by the parameter updating engine 104 in block 306. The approximate time-varying parameter $K_a$ at time $t_i$, $K_a(t_i)$, may be determined by the following equations based equations (3) and (6):

$$K_a(t_i) = g(X_a(t_i))^{-1}[-f(X_a(t_i),t_i) + \dot{X}_d(t_i) - \eta \operatorname{sgn}(s(t_i))] \quad (7)$$

and $$s(t_i) = X_a(t_i) - X_d(t_i) \quad (8)$$

The gain factor η may be used to manipulate the speed with which the approximate state trajectory $X_a(t)$ converges with the desired state trajectory $X_d(t)$. For example, a higher gain may result in a faster convergence between the nonlinear system model approximate state $X_a(t)$ and desired state $X_d(t)$. If the approximate state $X_a(t_i)$ is equal to the desired state $X_d(t_i)$, the approximate time-varying parameter $K_a(t_i)$ is not adjusted.

For example, in the population dynamics model, the predicted value for the population level, approximate state $X_a(t_i)$, determined using the dynamic equation for the population dynamics model and the approximate time-varying parameter $K_a(t_{i-1})$, and the experimentally determined value for the population level, desired state $X_d(t_i)$, at a time point $t_i$ may be used to evaluate equation (7). If the predicted population level equals the experimentally determined population level at time point $t_i$, the approximate time-varying parameter $K_a(t_i)$ that results from using equation (7) may be equal to $K_a(t_{i-1})$, i.e., the approximate time-varying parameter $K_a(t_i)$ may not be adjusted. Otherwise, if the predicted and experimental population values are not equal, equation (7) may produce another approximation of the time-varying parameter $K_a(t_i)$ that may be different from $K_a(t_{i-1})$.

In block 308, a determination may be made as to whether another time point $t_{i+1}$ may be evaluated. This may be determined based on the availability of data for further time points in a sampling of the nonlinear system input data 106. The sampling of the nonlinear system input data 106 may include all of or selected portions the nonlinear system input data 106. Selection may be made by, for example, a user, or automatically, and may be made before evaluation of the first time point, or before or after the evaluation of each time point. The time points included in the sampling may be changed dynamically during the evaluation process. The amount of time between time points i and i+1 may be a periodic amount or an aperiodic amount, as compared to the amount of time between other time points in the nonlinear system input data 106. If another time point is evaluated, flow proceeds to block 309, the index i of time point $t_i$ is incremented to i+1, and the updated parameters 109 may be sent to the nonlinear system simulator 103 through the data flow 111. Otherwise, flow proceeds to block 310. For example, in the population dynamics model, if there are more experimentally determined values for the population levels, another time point $t_{i+1}$ may be evaluated. Updated time-varying parameter $K_a(t_i)$, as determined by equation (7), may be sent from the parameter updating engine 104 to the nonlinear system simulator 103. Otherwise, if there are no more experimentally determined values for the population level at subsequent time points, or all the time points in the sampling have been evaluated, no further time points may be evaluated.

In block 309, another time point may be evaluated by incrementing the index i of time point $t_i$ and evaluating the nonlinear system dynamic equation 105 at the new time point with the nonlinear system simulator 103. The approximate state derivative $\dot{X}_a(t_i)$ at time $t_i$ and the approximate state $X_a(t_{i+1})$ at next time $t_{i+1}$ may be determined by the nonlinear system simulator 103. The approximate state derivative $\dot{X}_a(t_i)$ may be determined as follows, based on equation (1):

$$\dot{X}_a(t_i)=f(X_a(t_i),t_i)+g(X_a(t_i),t_i)K_a(t_i) \qquad (9)$$

The approximate state $X_a(t_{i+1})$ at next time point $t_{i+1}$ may be determined by integrating equation (9). Before proceeding to block 306, the time point $t_i$ is updated from i to i+1.

In block 310, the end of nonlinear system input data 106 has been reached or another time point is not to be evaluated, and the approximate time-varying parameter $K_a(t_i)$ may be provided for the evaluated time $t_i$. If the flow looped through blocks 306 and 307 p times, the approximate time-varying parameter $K_a(t_i)$ may be provided for 1≤i≤p for p≥1. As an option, the approximate time-varying parameter $K_a(t_i)$ may be provided for one, some, or all of the p time points. The approximate time-varying parameter $K_a(t_i)$ may be provided, for example by being stored, displayed, or forwarded. The approximate time varying parameter $K_a(t_i)$ may be stored, for example, in any type of computer-readable medium accessible to the computer 101. The approximate time-varying parameter $K_a(t_i)$ may be displayed, for example, on a display. The approximate time-varying parameter $K_a(t_i)$ may be forwarded by being provided to the computing environment 102, to another computing environment on the computer 101, to another computer, or over a network coupled to the computer. Further to the example above, the approximate time-varying parameter $K_a(t_i)$ may be provided to the user.

The approximate time-varying parameter of the nonlinear system model may be updated while the nonlinear system is being simulated. The approximate time-varying parameter $K_a(t_i)$ may be updated for each time point $t_i$. For each desired state $X_d(t_i)$ for which there is input data, the approximation of the time-varying parameter $K_a(t_i)$ may be updated in order to track the changes in the desired state $X_d(t_i)$. Hence, the approximate time-varying parameter $K_a(t_i)$ of the nonlinear system model may be determined based on the input data to be provided during the simulation of the nonlinear system model.

Blocks 305-310 may be performed within the computing environment 102 initiated in block 301. The nonlinear system dynamic equation 105, the nonlinear system input data 106, the nonlinear system dynamic equation parameters 107, and the Lyapunov function 108 may be received in blocks 302-304 as any suitable representation by the computing environment 102 via a default setting, from a user, from the computer 101 running the computing environment 102, from another computer coupled via a network to the computer 101 running the computing environment 102, or from equipment (e.g., hardware and/or software) coupled to the computer 101 running the computing environment 102. For example, the nonlinear system dynamic equation 105 may be received by being entered by a user using a text editor or equation editor that is part of the computing environment 102, or by accessing a representation of the nonlinear system dynamic equation 105 on computer 101, or by any of the other suitable method.

In another embodiment, uncertainty boundaries may be incorporated into the process of estimating a time-varying parameter of a nonlinear system. An uncertainty boundary may define an acceptable range within which a value for the nonlinear system model state will be considered acceptably close to the desired state for the nonlinear system according to the input data. Uncertainty boundaries may be used to compensate for uncertainties in the nonlinear system dynamic equation 105, such as, for example, known discrepancies between the model and input data, and/or for uncertainties in the input data which may be due to the inability to precisely control or observe the phenomena being modeled. For example, in the population dynamics model, it may not be possible to take exact counts of the population level at precise intervals, or to prevent some level of external interference with the population level that cannot be accounted for in the dynamic equation. An uncertainty boundary may also allow for the estimated values for the time-varying parameter to exhibit fewer small, rapid fluctuations that may be a byproduct of modeling uncertainties, resulting in a smoother curve for the value of the time-varying parameter over time.

Figure 4:
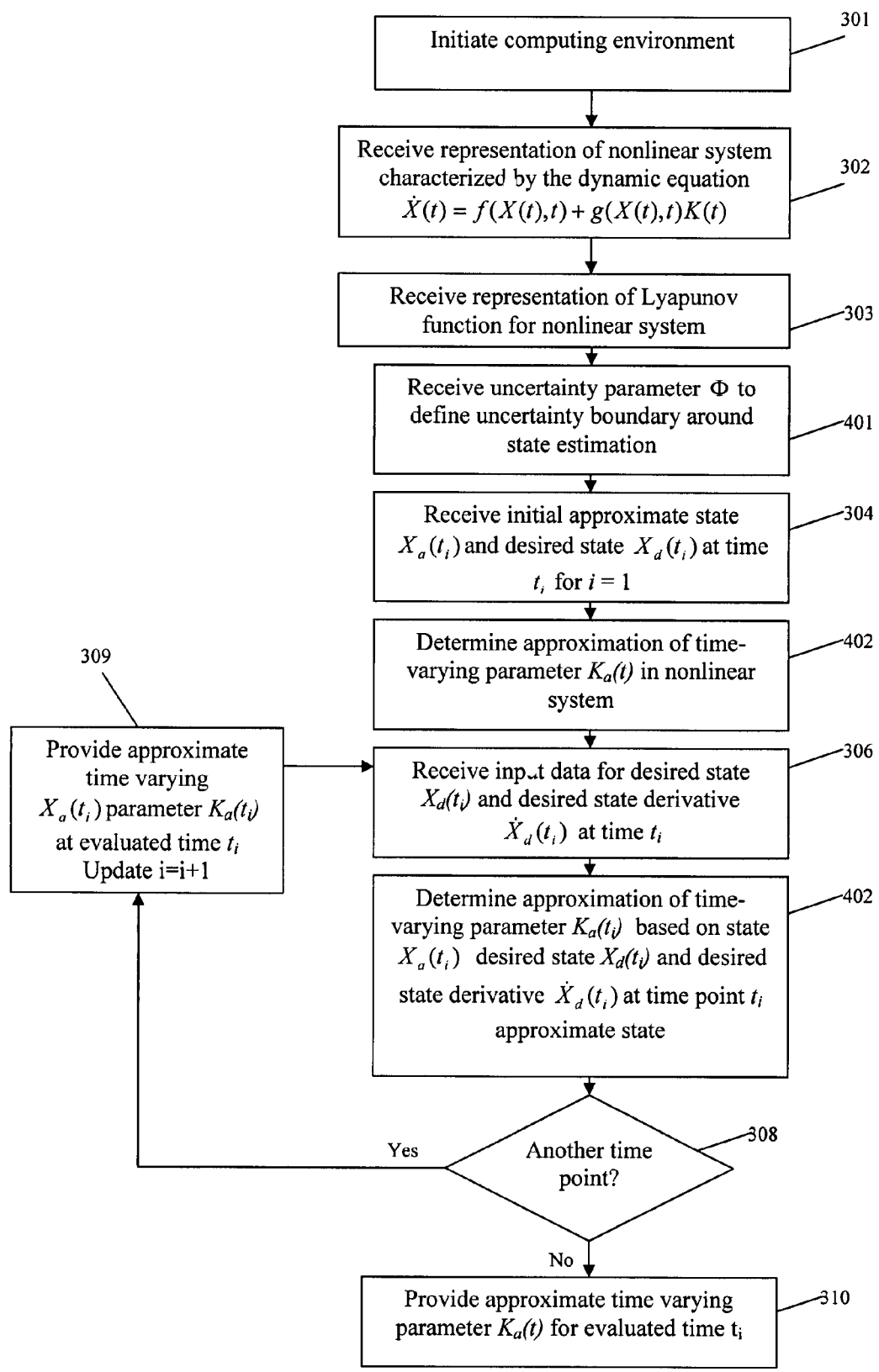
FIG. 4 depicts another exemplary flowchart for a process for estimating a time-varying parameter of a nonlinear system.

FIG. 4 depicts an exemplary flowchart for another process for estimating a time-varying parameter of a nonlinear system. Compared to the exemplary embodiment of FIG. 3, this exemplary embodiment includes an uncertainty parameter that may be used to define an uncertainty boundary around the desired state $X_d(t_i)$. Blocks 301-303, 304, 306 and 308-310 are the same as in FIG. 3, and new blocks 401, 402, and 403 are added.

In block 401, an uncertainty parameter 113 may be received by the computing environment 102 to define an uncertainty boundary around the state estimation. When the nonlinear system model approximate state $X_a(t_i)$ is evaluated at time $t_i$, if the nonlinear system model state is within the uncertainty boundary as compared to the desired state $X_d(t_i)$, then the approximate state $X_a(t_i)$ may be acceptably close to the desired state $X_d(t_i)$, and no adjustment may be made to the time-varying parameter $K_a(t_i)$. For example, if the uncertainty parameter 113 is 10%, a approximate state $X_a(t_i)$=95 at time $t_i$ may be considered acceptably close to a desired state $X_d(t_i)$=100, be treated as acceptably close to the desired state.

In an exemplary embodiment, a boundary layer B(t) may be defined with uncertainty parameter 113 Φ as the set of approximate states $X_a(t)$ such that $$|X_a(t)-X_d(t)|\le\Phi(t) \qquad (10)$$

where Φ(t)>0 may be time varying and represents the amount of uncertainty allowed in the state at time t. The uncertainty parameter 113 Φ(t) may be received by the computing environment 102 via a default setting, from a user, or by accessing the uncertainty parameter 113 Φ(t) (i) stored on the computer 101 (ii) stored on another computer coupled via a network to the computer 101, or (iii) from equipment (e.g., hardware and/or software) coupled to the computer 101.

In block 402, the approximate time-varying parameter $K_a(t)$ may be determined as follows, based on equations (1)-(5) and (10) above:

$$K_a(t) = g(X_a(t))^{-1}[-f(X_a(t),t) + \dot{X}_d(t) - \eta \text{sat}(s(t)/\Phi)] \quad (11)$$

where sat(Y/Φ) is a saturation function given by:

$$\text{sat}(Y_j/\Phi) = \begin{cases} = Y_j + \Phi & \text{for } Y_j < -\Phi \\ 0 & \text{for } -\Phi \leq Y_j \leq \Phi \\ = Y_j - \Phi & \text{for } Y_j > \Phi \end{cases} \quad (12)$$

where sat(Y/Φ)∈R" is an n-dimensional vector, Y∈R" is an n-dimensional vector, sat($Y_j$/Φ) is a scalar and the jth component of sat(Y/Φ), $Y_j$ is a scalar and an element of Y, and 1≤j≤n, and Φ is a scalar. This determination may be performed similarly to block 305, with the addition of the parameter updating engine 104 receiving the uncertainty parameter 113 Φ from the computing environment 102 in order to completely evaluate equation (11).

In block 403, the approximate time varying parameter $K_a(t_i)$ may be determined based on the approximate state $X_a(t_i)$, the desired state $X_d(t_i)$, and the desired state derivative $\dot{X}_d(t_i)$ at time $t_i$. The approximate time-varying parameter $K_a(t_i)$ may be determined as follows, based on equations (3), (11) and (12):

$$K_a(t_i) = g(X_a(t))^{-1}[-f(X_a(t),t) + \dot{X}_d(t) - \eta \text{sat}(S(t_i)/\Phi)] \quad (13)$$

As in block 307, the gain factor η may be used to manipulate the speed with which the approximate time-varying parameter $K_a(t)$ is adjusted. According to equation (14), if the approximate state $X_a(t_i)$ and the desired state $X_d(t_i)$ satisfy the following $$|X_a(t_i) - X_d(t_i)| \leq \Phi(t) \quad (14)$$

then the approximate time-varying parameter $K_a(t_i)$ may not be adjusted at time $t_i$.

For example, in the population dynamics model, the uncertainty boundary may be based around the values for population levels provided by experimentally observed data. If the experimental data for time point t is a value indicating a population level of 100, and if the uncertainty parameter Φ=0.10, the uncertainty boundary may have an upper bound of 110 and a lower bound of 90. If the value for the population level predicted by the dynamic equation for the population dynamics model and the time-varying parameter $K_a(t)$ falls within the upper bound and lower bound defined by the uncertainty boundary, for example, a predicted value of 103, the predicted value may be considered to be acceptably close to the experimental value. If the predicted value for the population level is acceptably close to the experimental value, the approximate time-varying parameter $K_a(t)$ may not be adjusted by equation (13).

Blocks 401, 305, 306, 403, and 308-310 may be performed with the computing environment 102 initiated in block 301.

Another example of a nonlinear system may be a radioactive decay model. The nonlinear system dynamic equation 105 for the radioactive decay model may be:

$$\dot{X}_a(t) = X_a(t)*(-K_a(t)) \quad (15)$$

where $X_a(t)$ may represent the current amount of radioactive material, $\dot{X}_a(t)$ may represent the change in amount of radioactive material, and $K_a(t)$ may be the nonlinear dynamic equation parameters 107 representing a factor that may cause changes to the amount of radioactive material, for example, the decay rate of the radioactive material. K(t) may be a time-varying parameter.

Placing the nonlinear system dynamic equation (15) for the radioactive decay model into the form of equation (1) results:

$$\dot{X}_a(t) = f(X_a(t),t) + g(X_a(t),t)K(t), f(X_a(t),t) = 0,$$
$$g(X_a(t),t) = -X_a(t) \quad (16)$$

The Lyapunov function 108 for the radioactive decay model may be:

$$V = (\tfrac{1}{2})s^2 \quad (17)$$

and the derivative of the Lyapunov function 108 may be:

$$\dot{V}(t) = s(t)*\dot{s}(t), s(t) = X_a(t) - X_d(t), \dot{s}(t) = \dot{X}_a(t) - \dot{X}_d(t),$$
$$\dot{X}_a(t) = X_a(t)*(-K(t)) \quad (18)$$

Through substitution from equation (16), the derivative of the Lyapunov function may be written as:

$$\dot{V}(t) = s(t)*(-K_a(t)(X_a(t)) - \dot{X}_d(t)) \quad (19)$$

The nonlinear system dynamic equation parameters 107 K(t) may be evaluated using a version of equation (6) for the radioactive decay model, created by substituting for $g(X_a(t),t)$ and $f(X_a(t),t)$ in equation (11) with the equalities from the equation (16) for the radioactive decay model:

$$K_a(t) = g(X_a(t))^{-1}[-f(X_a(t),t) + \dot{X}_d(t) - \eta \text{sat}(s(t)/\Phi))],$$
$$f(X_a(t),t) = 0, g(X_a(t),t) = -X_a(t) \quad (20)$$

This may result in the following version of equation (13) for the radioactive decay model:

$$K_a(t) = (-1/X_a(t))[\dot{X}_d(t) - \eta \text{sat}(s(t)/\Phi))] \quad (21)$$

Substituting for $K_a(t)$ in equation (19) results in the equation:

$$\dot{X}_a = \dot{X}_d(t) - \eta \text{sat}(s(t)/\Phi) \quad (22)$$

The parameter updating engine 104 may use equations (21) and (22) to generate the updated parameters 109.

FIGS. 5A-5E depict results from estimating a time-varying parameter of an exemplary nonlinear system characterized by equation (1), which in this case is the radioactive decay model defined by nonlinear system dynamic equation (15). The approximation of the time varying parameter for the nonlinear system may be based on equation (25), where the gain factor η=200, the uncertainty parameter Φ=0.10, and the initial approximate state $X_a(t_1)$=1500, for $t_1$=0.

Figure 5A:
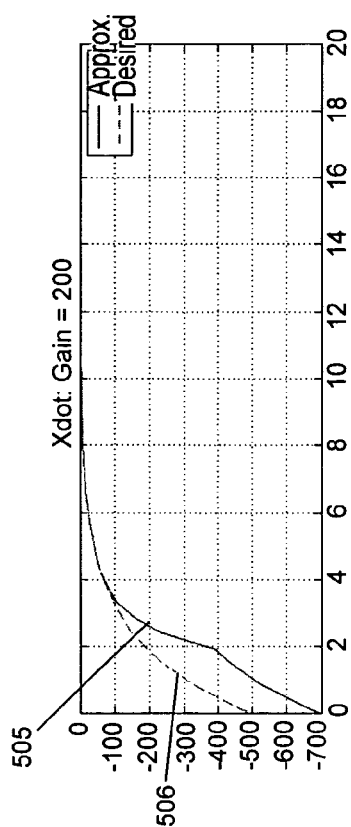
FIGS. 5A-5E depict results from estimating a time-varying parameter of an exemplary nonlinear system.

FIG. 5A depicts an exemplary graph for the approximate state $X_a(t)$ for the amount of radioactive material, represented by the solid line 501, and the desired state $X_d(t)$ for the amount of radioactive material, represented by the dotted line 502, against time. The values for approximate state $X_a(t)$ may be predicted values for the amount of radioactive material, and may be determined by integrating (15) using the previous value of approximate time-varying parameter $K_a(t)$ from equations (21) and (22). The values of $X_d(t)$ may be received from input data for radioactive decay, as described above in block 306. At the outset, the approximate state $X_a(t)$ is different from the desired state $X_d(t)$, as equation (15) may not correctly predict the amount of radioactive material. As the evaluation progresses, the approximate state $X_a(t)$ better approximates the desired state $X_d(t)$, producing values for the amount of radioactive material which are closer to the values from the input data. This may be due to the adjustment of the approximate time-varying parameter $K_a(t)$ with equation (21) and (22). At around $t_i$=3.5, approximate state $X_a(t)$ almost completely matches the desired state $X_d(t)$, as equation (15) produces values for the amount of radioactive material using $K_a(t)$ that match the values from the input data.

Figure 5B:
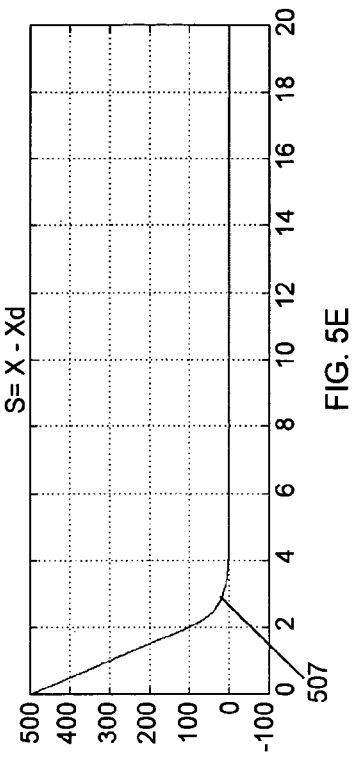

FIG. 5B depicts an exemplary graph for the approximate time-varying parameter $K_a(t_i)$, represented by the solid line 503, against time. The values for approximate time-varying parameter $K_a(t_i)$ may be determined by equations (21) and (22), as in block 403 above. During the time period in which the approximate state $X_a(t)$ differs from the desired state $X_d(t)$, the approximate time-varying parameter $K_a(t_i)$ fluctuates, as it may be adjusted by equations (21) and (22) based on the difference between approximate state $X_a(t)$ and desired state $X_d(t)$. As the evaluation progresses, the approximate time-varying parameter $K_a(t_i)$ settles near a single value during the time period in which the approximate state $X_a(t)$ matches the desired state $X_d(t)$ to within the uncertainty boundary of 10% set by the uncertainty parameter $\Phi$. When the approximate state $X_a(t)$ matches the desired state $X_d(t)$ to within the uncertainty boundary, as determined by equation (14), the approximate time-varying parameter $K_a(t_i)$ may not need to be adjusted with equations (21) and (22). In this exemplary nonlinear system, the approximate time-varying parameter $K_a(t_i)$ has a value of about 0.5 when the $t_i$=3.5, and maintains that value for $t_i$>3.5, indicating that the time-varying parameter for this exemplary nonlinear system is actually a constant parameter with a value of about 0.5.

Figure 5C:
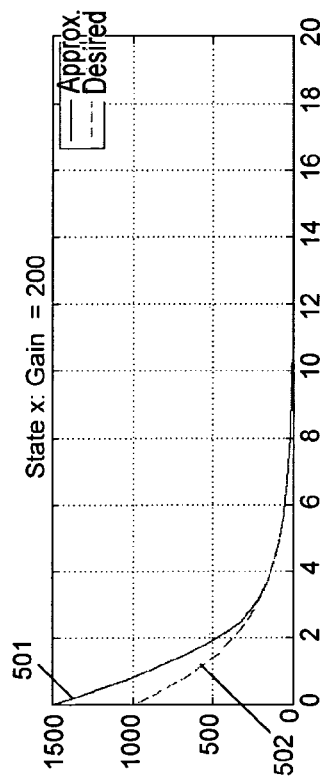

FIG. 5C depicts an exemplary graph for a Lyapunov function, represented by the solid line 504, against time. The values for the Lyapunov function may be determined by equation (17). The Lyapunov function consistently decreases towards 0 as time increases. As the Lyapunov function decreases the approximate state $X_a(t)$ becomes closer to the desired state $X_d(t)$.

Figure 5D:
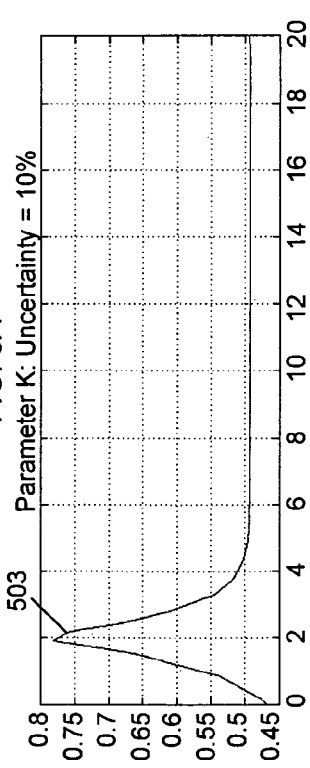

FIG. 5D depicts an exemplary graph for the derivative of the approximate state $\dot{X}_a(t)$, represented by the solid line 505, and the derivative of the desired state $\dot{X}_d(t)$, represented by the dotted line 506, against time. Values for solid line 505 may be generated using equation (15), while values for dotted line 506 may be generated by calculating the change in value of the desired state $X_d(t)$ between consecutive time points. As the approximate state $X_a(t)$ converges with the desired state $X_d(t)$, the derivative of approximate state $\dot{X}_a(t)$ converges with the derivative of the desired state $\dot{X}_d(t)$.

Figure 5E:
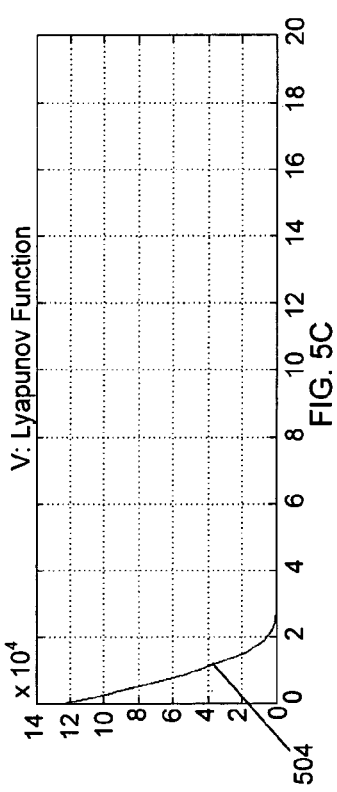

FIG. 5E depicts an exemplary graph for the difference $s(t_i)=X_a(t_i)-X_d(t_i)$, represented by the solid line 507, between the approximate state $X_a(t)$ and the desired state $X_d(t)$. As the approximate state $X_a(t)$ converges with the desired state $X_d(t)$, the difference $X_a(t_i)-X_d(t_i)$ between the approximate state $X_a(t)$ and the desired state $X_d(t)$ approaches 0. In this exemplary nonlinear system, $X_a(t_i)-X_d(t_i)\approx 0$ when $t_i\geq 3.5$.

FIGS. 6A-6E depict results from estimating a time-varying parameter of an exemplary nonlinear system, the radioactive decay model of equation (15). The approximation of the nonlinear system may be based on the integration of equation (15). The approximate time-varying parameter may be based on equations (21) and (22), where the gain factor $\eta$=400, the uncertainty parameter $\Phi$=0.10, and the initial approximate state $X_a(t_1)$=1500 for $t_1$=0. In comparison to FIGS. 5A-5E, the approximate state $X_a(t)$, represented by the solid line 601 of FIG. 6A, and the desired state $X_d(t)$, represented by the dotted line 602 of FIG. 6A, converge faster. This may be the result of the higher gain factor $\eta$=400 as compared to the gain factor $\eta$=200 in FIGS. 5A-5E. As the evaluation progresses, the approximate state $X_a(t)$ better approximates the desired state $X_d(t)$, and at around $t_i$=2 (as compared to $t_i$=3.5 in FIG. 6A, almost completely matches the desired state $X_d(t)$.

FIGS. 7A-7E depict results from estimating a time-varying parameter of an exemplary nonlinear system, the radioactive decay model of equation (15). The approximation of the nonlinear system may be based on the integration of equation (15). The approximate time-varying parameter may be based on equations (21) and (22), where the gain factor $\eta$=200, the uncertainty parameter $\Phi$=0.02, the initial approximate state $X_a(t_1)$=1500, and $t_1$=0. In comparison to FIGS. 5A-5E, the approximate time-varying parameter $K_a(t_i)$, represented by the solid line 703 of FIG. 7B, fluctuates after settling near a single value after approximately $t_i$=2.5. The approximate time-varying parameter $K_a(t_i)$ fluctuates during the time period in which the approximate state $X_a(t)$ matches the desired state $X_d(t)$ to within the uncertainty boundary of 2% set by the uncertainty parameter $\Phi$. The approximate time-varying $K_a(t_i)$ has a value of about 0.5 when $t_i$=2.5. For $t_i$>2.5, the approximate time-varying parameter $K_a(t_i)$ fluctuates around about 0.5. The fluctuation may be due to chattering around the equilibrium point caused by a lower uncertainty parameter of 0.02.

FIGS. 8A-8E depict results from estimating a time-varying parameter of an exemplary nonlinear system, the radioactive decay model of equation (15). The approximation of the nonlinear system may be based on the integration of equation (15). The approximate time-varying parameter may be based on equations (21) and (22), where the gain factor $\eta$=400, the uncertainty parameter $\Phi$=0.02, the initial approximate state $X_a(t_i)$=1500, and $t_1$=0. In comparison to FIGS. 5A-5E, 6A-6E, and 7A-7E, the approximate state $X_a(t)$, represented by the solid line 801 of FIG. 8A, and the desired state $X_d(t)$, represented by the dotted line 802 of FIG. 8A, converge faster. This may be the result of the higher gain factor $\eta$=400 as compared to the gain factor $\eta$=200 in FIGS. 5A-5E and FIGS. 7A-7E. As the evaluation progresses, the approximate state $X_a(t)$ better approximates the desired state $X_d(t)$, and at around $t_i$=1.8, almost completely matches the desired state $X_d(t)$. The approximate time-varying parameter $K_a(t_i)$, represented by the solid line 803 of FIG. 8B fluctuates to a minor degree even after it has settled near a single value after approximately $t_i$=1.8. The approximate time-varying parameter $K_a(t_i)$ fluctuates during the time period in which the approximate state $X_a(t)$ matches the desired state $X_d(t)$ to within the uncertainty boundary of 2% set by the uncertainty parameter $\Phi$. The approximate time-varying $K_a(t_i)$ has a value of about 0.5 when $t_i$=1.8. For $t_i$>1.8, the approximate time-varying parameter $K_a(t_i)$ fluctuates around about 0.5. Compared to FIGS. 7A-7E, which have the same uncertainty parameter $\Phi$=0.02, the approximate time-varying parameter $K_a(t_i)$ settles faster at approximately $t_i$=1.8, compared to approximately $t_i$=2.3.

Figure 9:
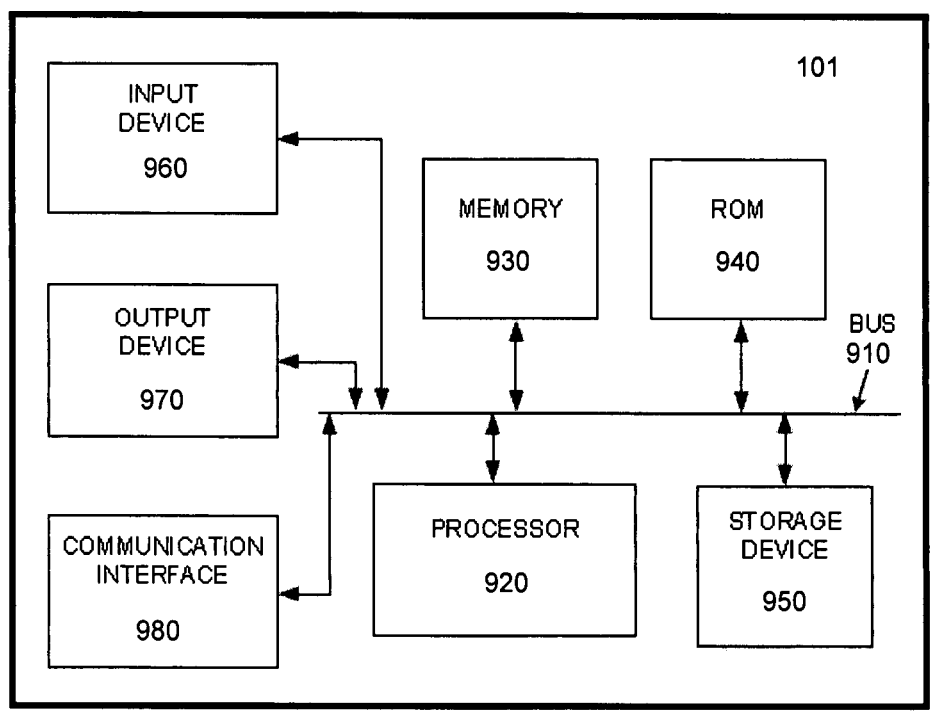
FIG. 9 depicts a computer system for use with exemplary embodiments.

FIG. 9 illustrates an exemplary architecture for implementing the computer 101 of FIG. 1. It will be appreciated that other devices that can be used with the computer 101, such as a client or a server, may be similarly configured. As illustrated in FIG. 9, computer 101 may include a bus 910, a processor 920, a memory 930, a read only memory (ROM) 940, a storage device 950, an input device 960, an output device 970, and a communication interface 980.

Bus 910 may include one or more interconnects that permit communication among the components of computer 101. Processor 920 may include any type of processor, microprocessor, or processing logic that may interpret and execute instructions (e.g., a field programmable gate array (FPGA)). Processor 920 may include a single device (e.g., a single core) and/or a group of devices (e.g., multi-core). Memory 930 may include a random access memory (RAM) or another type of dynamic storage device that may store information and instructions for execution by processor 920. Memory 930 may also be used to store temporary variables or other intermediate information during execution of instructions by processor 920.

ROM 940 may include a ROM device and/or another type of static storage device that may store static information and instructions for processor 920. Storage device 950 may include a magnetic disk and/or optical disk and its corresponding drive for storing information and/or instructions.

Storage device 950 may include a single storage device or multiple storage devices, such as multiple storage devices operating in parallel. Moreover, storage device 950 may reside locally on the computer 101 and/or may be remote with respect to a server and connected thereto via network and/or another type of connection, such as a dedicated link or channel.

Input device 960 may include any mechanism or combination of mechanisms that permit an operator to input information to computer 101, such as a keyboard, a mouse, a touch sensitive display device, a microphone, a pen-based pointing device, and/or a biometric input device, such as a voice recognition device and/or a finger print scanning device. Output device 970 may include any mechanism or combination of mechanisms that outputs information to the operator, including a display, a printer, a speaker, etc.

Communication interface 980 may include any transceiver-like mechanism that enables computer 101 to communicate with other devices and/or systems, such as a client, a server, a license manager, a vendor, etc. For example, communication interface 980 may include one or more interfaces, such as a first interface coupled to a network and/or a second interface coupled to a license manager. Alternatively, communication interface 980 may include other mechanisms (e.g., a wireless interface) for communicating via a network, such as a wireless network. In one implementation, communication interface 980 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 101 may perform certain functions in response to processor 920 executing software instructions contained in a computer-readable medium, such as memory 930. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments of the invention may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for estimating a time-varying parameter of a simulated nonlinear system, comprising:
   (a) receiving by a computer input data for the simulated nonlinear system, the input data comprising a desired state and a desired state derivative of the simulated nonlinear system at a plurality of time points;
   (b) generating by the computer for one of the plurality of time points an approximate time-varying parameter based on at least the desired state, the desired state derivative, a simulated approximate state of the simulated nonlinear system, and a Lyapunov function;
   (c) providing by the computer the approximate time-varying parameter for the one of the plurality of time points; and
   (d) determining by the computer, an approximate state for a next time point and an approximate state derivative for a current time point of the simulated nonlinear system using the approximate time-varying parameter, wherein the computer is programmed to execute steps (a)-(d).

2. The method of claim 1, wherein the simulated nonlinear system is characterized by the equation $$\dot{X}(t)=f(X(t),t)+g(X(t),t)K(t)$$

wherein $X(t) \in R^n$ is an n-dimensional vector representing a state of the simulated nonlinear system, t is a scalar time variable, $K(t) \in R^m$ is an m-dimensional vector dependent on t representing a time-varying parameter of the simulated nonlinear system, $f \in R^n$ is an n-dimensional nonlinear function dependent upon X(t) and t, $g \in R^{n \times m}$ is a nonlinear function dependent upon X(t) and t, and $\dot{X}(t) \in R^n$ is an n-dimensional vector representing a time derivative of the state vector X(t).

3. The method of claim 1, further comprising:
   repeating (b) for one or more of the plurality of time points.

4. The method of claim 3, further comprising, after (b), performing (c) for one or more of the plurality of time points.

5. The method of claim 1, wherein the approximate state derivative is determined based on:

$$\dot{X}_a(t_i)=f(X_a(t_i),t_i)+g(X_a(t_i),t_i)K_a(t_i)$$

wherein $X_a(t) \in R^n$ is an n-dimensional vector representing an approximate state of the simulated nonlinear system, t is a scalar time variable, $K_a(t) \in R^m$ is an m-dimensional vector dependent on t representing a time-varying parameter of the simulated nonlinear system, $f \in R^n$ is an n-dimensional nonlinear function dependent upon $X_a(t)$ and t, $g \in R^{n \times m}$ is a nonlinear function dependent upon $X_a(t)$ and t, and $\dot{X}(t) \in R^n$ is an n-dimensional vector representing a time derivative of the state vector $X_a(t)$.

6. The method of claim 1, wherein the approximate state for the next time point is based on the approximate state and the approximate state derivative at the current time point.

7. The method of claim 1, wherein the approximate time-varying parameter is generated while the approximate states are simulated for the simulated nonlinear system.

8. The method of claim 1, wherein the approximate time-varying parameter is generated based on $$K_a(t)=g(X_a(t))^{-1}[-f(X_a(t),t)+\dot{X}_d(t)-\eta \operatorname{sgn}(s(t))]$$

wherein $X_a(t) \in R^n$ is an n-dimensional vector representing an approximate state of the simulated nonlinear system, $X_d(t) \in R^n$ is an n-dimensional vector representing a desired state of the simulated nonlinear system, t is a scalar time variable, $K_a(t) \in R^m$ is an m-dimensional vector dependent on t representing an approximate time-varying parameter of the simulated nonlinear system, $f \in R^n$ is an n-dimensional nonlinear function dependent upon $X_a(t)$ and t, $g \in R^{n \times m}$ is a nonlinear function dependent upon $X_a(t)$ and t, $\dot{X}_d(t) \in R^n$ is an n-dimensional vector representing the dynamics of the simulated nonlinear system and is a time derivative of the desired state vector $X_d(t)$, $\eta$ is a scalar gain factor, and s(t) is a difference between $X_a(t)$ and $X_d(t)$, and sgn(s(t)) is the signum function.

9. The method of claim 1, wherein generating the approximate time-varying parameter is based on an uncertainty boundary defined by an uncertainty parameter.

10. The method of claim 1, wherein the approximate time-varying parameter is generated based on $$K_a(t)=g(X_a(t))^{-1}[-f(X_a(t),t)+\dot{X}_d(t)-\eta\mathrm{sat}(s(t)/\Phi)]$$

wherein $X_a(t) \in R^n$ is an n-dimensional vector representing an approximate state of the simulated nonlinear system, $X_d(t) \in R^n$ is an n-dimensional vector representing a desired state of the simulated nonlinear system, t is a scalar time variable, $K_a(t) \in R^m$ is an m-dimensional vector dependent on t representing an approximate time-varying parameter of the simulated nonlinear system, $f \in R^n$ is an n-dimensional nonlinear function dependent upon $X_a(t)$ and t, $g \in R^{n \times m}$ is a nonlinear function dependent upon $X_a(t)$ and t, $\dot{X}_d(t) \in R^n$ is an n-dimensional vector is a time derivative of the desired state vector $X_d(t)$, $\eta$ is a scalar gain factor, s(t) is a difference between $X_a(t)$ and $X_d(t)$, and $\Phi>0$ is scalar and an uncertainty parameter, and sat $(s(t)/\Phi)$ is the saturation function.

11. A computer-implemented method for estimating a time-varying parameter of a simulated nonlinear system, comprising:
downloading software to a computer system, which when executed by the computer system causes the computer system to perform operations comprising the method of claim 1.

12. A computer-implemented method for estimating a time-varying parameter of a simulated nonlinear system, comprising:
providing downloadable software to a computer system, which when executed by the computer system causes the computer system to perform operations comprising the method of claim 1.

13. A non-transitory computer-readable medium comprising instructions, which when executed by a computer system causes the computer system to perform operations for estimating a time-varying parameter of a simulated nonlinear system, the computer-readable medium comprising:
(a) instructions for receiving input data for the simulated nonlinear system, the input data comprising a desired state and a desired state derivative of the simulated nonlinear system at a plurality of time points;
(b) instructions for generating for one of the plurality of time points an approximate time-varying parameter based on at least the desired state, the desired state derivative, an approximate state of the simulated nonlinear system, and a Lyapunov function;
(c) instructions for providing the approximate time-varying parameter for the one of the plurality of time points; and
(d) instructions for determining an approximate state for a next time point and an approximate state derivative for a current time point of the simulated nonlinear system using the approximate time-varying parameter.

14. The non-transitory computer-readable medium of claim 13, wherein the simulated nonlinear system is characterized by the equation $$\dot{X}(t)=f(X(t),t)+g(X(t),t)K(t)$$

wherein $X(t) \in R^n$ is an n-dimensional vector representing a state of the simulated nonlinear system, t is a scalar time variable, $K(t) \in R^m$ is an m-dimensional vector dependent on t representing a time-varying parameter of the simulated nonlinear system, $f \in R^n$ is an n-dimensional nonlinear function dependent upon X(t) and t, $g \in R^{n \times m}$ is a nonlinear function dependent upon X(t) and t, and $\dot{X}(t) \in R^n$ is an n-dimensional vector representing a time derivative of the state vector X(t).

15. The non-transitory computer-readable medium of claim 13, further comprising:
instructions for repeating (b) for one or more of the plurality of time points.

16. The non-transitory method of claim 15, further comprising, after (b), instructions for performing (c) for one or more of the plurality of time points.

17. The non-transitory computer-readable medium of claim 13, wherein the approximate state derivative is determined based on:

$$\dot{X}_a(t_i)=f(X_a(t_i),t_i)+g(X_a(t_i),t_i)K_a(t_i)$$

wherein $X_a(t) \in R^n$ is an n-dimensional vector representing an approximate state of the simulated nonlinear system, t is a scalar time variable, $K_a(t) \in R^m$ is an m-dimensional vector dependent on t representing a time-varying parameter of the simulated nonlinear system $f \in R^n$ is an n-dimensional nonlinear function dependent upon $X_a(t)$ and t, $g \in R^{n \times m}$ is a nonlinear function dependent upon $X_a(t)$ and t, and $\dot{X}_a(t) \in R^n$ is an n-dimensional vector representing a time derivative of the state vector $X_a(t)$.

18. The non-transitory computer-readable medium of claim 13, wherein the approximate state for the next time point is based the approximate state and the approximate state derivative at the current time point.

19. The non-transitory computer-readable medium of claim 13, wherein the approximate time-varying parameter is generated while the approximate states are simulated for the simulated nonlinear system.

20. The non-transitory computer-readable medium of claim 13, wherein the approximate time-varying parameter is generated based on $$K_a(t)=g(X_a(t))^{-1}[-f(X_a(t),t)+\dot{X}_d(t)-\eta\mathrm{sgn}(s(t))]$$

wherein $X_a(t) \in R^n$ is an n-dimensional vector representing an approximate state of the simulated nonlinear system, $X_d(t) \in R^n$ is an n-dimensional vector representing a desired state of the simulated nonlinear system, t is a scalar time variable, $K_a(t) \in R^m$ is an m-dimensional vector dependent on t representing an approximate time-varying parameter of the simulated nonlinear system, $f \in R^n$ is an n-dimensional nonlinear function dependent upon $X_a(t)$ and t, $g \in R^{n \times m}$ is a nonlinear function dependent upon $X_a(t)$ and t, $\dot{X}_d(t) \in R^n$ is an n-dimensional vector and is a time derivative of the desired state vector $X_d(t)$, $\eta$ is a scalar gain factor, and s(t) is a difference between $X_a(t)$ and $X_d(t)$, and sgn(s(t)) is the signum function.

21. The non-transitory computer-readable medium of claim 13, wherein generating the approximate time-varying parameter is based on an uncertainty boundary defined by an uncertainty parameter.

22. The non-transitory computer-readable medium of claim 13, wherein the approximate time-varying parameter is generated based on $$K_a(t)=g(X_a(t))^{-1}[-f(X_a(t),t)+\dot{X}_d(t)-\eta\mathrm{sat}(S(t)/\Phi)]$$

wherein $X_a(t) \in R^n$ is an n-dimensional vector representing an approximate state of the simulated nonlinear system, $X_d(t) \in R^n$ is an n-dimensional vector representing a desired state of the simulated nonlinear system, t is a scalar time variable, $k_a(t) \in R^m$ is an m-dimensional vector dependent on t representing an approximate time-varying parameter of the simulated nonlinear system, $f \in R^n$ is an n-dimensional nonlinear function dependent upon $X_a(t)$ and t, $g \in R^{n \times m}$ is a nonlinear function dependent upon $X_a(t)$ and t, $\dot{X}_d(t) \in R^n$ is an n-dimensional vector representing the dynamics of the simulated nonlinear system and is a time derivative of the desired state vector $X_d(t)$, $\eta$ is a scalar gain factor, s(t) is a difference between $X_a(t)$ and $X_d(t)$, and $\Phi>0$ is scalar and an uncertainty parameter.

23. A system for estimating a time-varying parameter of a simulated nonlinear system comprising:
- an input device configured to receive input data for the simulated nonlinear system, the input data comprising a desired state and a desired state derivative of the simulated nonlinear system at a plurality of time points; and
- a processor coupled to the input device and including a parameter updating engine configured to:
  - generate for one of the plurality of time points an approximate time-varying parameter based on at least the desired state, the desired state derivative, an approximate state of the simulated nonlinear system, and a Lyapunov function;
  - provide the approximate time-varying parameter for the one of the plurality of time points; and
  - determine an approximate state for a next time point and an approximate state derivative for a current time point of the simulated nonlinear system using the approximate time-varying parameter.

* * * * *

UNITED STATES PATENT AND TRADEMARK OFFICE
CERTIFICATE OF CORRECTION

PATENT NO. : 8,700,686 B1  Page 1 of 1
APPLICATION NO. : 11/984094
DATED : April 15, 2014
INVENTOR(S) : Shrikant V. Savant It is certified that error appears in the above-identified patent and that said Letters Patent is hereby corrected as shown below:

In the claims:

In claim 5, at column 18, in line 39, " $X(t) \in R^n$ " should be -- $X_d(t) \in R^n$ --.

Signed and Sealed this
Eighth Day of July, 2014

Michelle K. Lee
*Deputy Director of the United States Patent and Trademark Office*